(12) United States Patent
Dolganow et al.

(10) Patent No.: US 8,159,941 B2
(45) Date of Patent: Apr. 17, 2012

(54) IN-BAND DPI MEDIA RESERVATION MODIFICATIONS TO RFC 3313

(75) Inventors: Andrew Dolganow, Kanata (CA); Steven Edward Morin, Ottawa (CA)

(73) Assignee: Alcatel Lucent, Paris (FR)

( * ) Notice: Subject to any disclaimer, the term of this patent is extended or adjusted under 35 U.S.C. 154(b) by 196 days.

(21) Appl. No.: 12/200,598

(22) Filed: Aug. 28, 2008

(65) Prior Publication Data

US 2010/0054257 A1      Mar. 4, 2010

(51) Int. Cl.
    *H04J 1/16*      (2006.01)
(52) U.S. Cl. .................. 370/230; 370/230.1; 370/235; 370/389; 370/473
(58) Field of Classification Search ............. 370/395.21, 370/230, 230.1, 235, 389, 473, 351, 386
    See application file for complete search history.

(56) References Cited

U.S. PATENT DOCUMENTS

| | | | |
|---|---|---|---|
| 6,366,577 B1 * | 4/2002 | Donovan | 370/352 |
| 6,647,412 B1 * | 11/2003 | Strandberg et al. | 709/223 |
| 6,775,280 B1 * | 8/2004 | Ma et al. | 370/392 |
| 6,910,074 B1 * | 6/2005 | Amin et al. | 709/227 |
| 6,970,930 B1 * | 11/2005 | Donovan | 709/227 |
| 7,039,053 B1 * | 5/2006 | Freed et al. | 370/392 |
| 7,403,482 B2 * | 7/2008 | Izmailov et al. | 370/238 |
| 7,522,591 B2 * | 4/2009 | Kiyoto et al. | 370/389 |
| 7,649,881 B2 * | 1/2010 | Casey | 370/389 |
| 7,773,510 B2 * | 8/2010 | Back et al. | 370/230 |
| 2002/0194369 A1 * | 12/2002 | Rawlins et al. | 709/238 |
| 2006/0149845 A1 | 7/2006 | Malin | |
| 2006/0239188 A1 * | 10/2006 | Weiss et al. | 370/229 |
| 2007/0061433 A1 * | 3/2007 | Reynolds et al. | 709/223 |
| 2007/0133559 A1 * | 6/2007 | Ko et al. | 370/395.21 |
| 2007/0153798 A1 * | 7/2007 | Krstulich | 370/392 |
| 2007/0168466 A1 | 7/2007 | Tooley | |
| 2007/0220251 A1 * | 9/2007 | Rosenberg et al. | 713/156 |
| 2007/0276957 A1 * | 11/2007 | King et al. | 709/238 |
| 2008/0019371 A1 | 1/2008 | Anschutz | |
| 2008/0037425 A1 | 2/2008 | Pan | |

(Continued)

FOREIGN PATENT DOCUMENTS

| | | |
|---|---|---|
| EP | 2095566 A1 | 9/2009 |
| WO | 2006/074008 A2 | 7/2006 |
| WO | 2007/047479 A2 | 4/2007 |
| WO | 2008/070959 A1 | 6/2008 |

*Primary Examiner* — Ricky Ngo
*Assistant Examiner* — Dewanda Samuel
(74) *Attorney, Agent, or Firm* — Kramer & Amado, P.C.

(57) ABSTRACT

In various exemplary embodiments, a Deep Packet Inspection device is integrated into a provider edge router associated with a user agent client or provided externally. The DPI device monitors the exchange of packets between an originating proxy and a user agent client and inspects the packets to identify SIP control messages. By monitoring the messages exchanged between the two devices, the DPI device may determine the type of application, desired QoS, source, destination, and other information related to the connection. Using this information, the router may then access a policy database to determine whether there is a QoS policy for the application and/or user. Based on this determination, the router may initiate network reservation for an anticipated data flow or store the information so the flow of packets can be remarked as the packets arrive. Accordingly, in various exemplary embodiments, the edge router is aware that QoS should be granted.

25 Claims, 5 Drawing Sheets

U.S. PATENT DOCUMENTS

| | | | |
|---|---|---|---|
| 2008/0056153 A1* | 3/2008 | Liu | 370/252 |
| 2008/0089324 A1* | 4/2008 | Polk et al. | 370/389 |
| 2008/0144602 A1 | 6/2008 | Casey | |
| 2008/0144615 A1* | 6/2008 | Casey | 370/389 |
| 2009/0034426 A1* | 2/2009 | Luft et al. | 370/252 |
| 2009/0042537 A1* | 2/2009 | Gelbman et al. | 455/406 |

* cited by examiner

IN-BAND DPI MEDIA RESERVATION MODIFICATIONS TO RFC 3313

BACKGROUND OF THE INVENTION

1. Field of the Invention

This invention relates generally to media reservation in an IP network.

2. Description of Related Art

Modern Internet Protocol (IP) networks enable users to communicate in more ways than ever before. Users may now exchange information using Voice over IP (VoIP), video calls, video conferencing, streaming multimedia, instant messaging, and countless other applications. As the number of methods of communication has increased, the signaling required to establish and maintain connections has become more complex.

The Session Initiation Protocol (SIP), defined in RFC 3261, is a signaling protocol developed to set-up, modify, and terminate multimedia sessions between users in an IP network. By providing a standard format for setup messages, SIP enables devices to negotiate parameters of a multimedia session in a seamless manner, regardless of the underlying transport protocols. Given its simplicity and flexibility, many current systems utilize SIP messaging and many systems in development will also use SIP.

Briefly stated, SIP enables an initiating user, or user agent client (UAC), to request that a connection be established with, another user, known as the user agent server (UAS). The UAC sends a connection request to a proxy server, which coordinates the exchange of setup messages between the UAC and UAS and provides each party with information necessary to establish the connection. After the connection is initiated, the UAC and UAS may directly exchange messages using an appropriate transport protocol, such as the Real-Time Transport Protocol (RTP).

Although RFC 3261 greatly simplifies the process of establishing a connection between two users, the standard does not provide an effective means for modifying Quality of Service (QoS) and guarding against: denial of service attacks. RFC 3313, published shortly after RFC 3261, attempts to solve these problems by defining an extension to integrate QoS admission control into SIP signaling messages, in particular, RFC 3313 seeks to improve users' Quality of Experience (QoE) by allowing specific media reservation in Layers 1-3 of the Open Systems Interconnection (OSI) model.

In a system supporting the RFC 3313 extension, when a UAC sends a connection request through a proxy, the proxy authenticates the caller and verifies that the caller is authorized to receive QoS. The proxy then exchanges messages with an edge router or a policy decision point (PDP) to obtain an authorization token and forwards this token to the UAC. Upon initiation of the connection, the UAC sends the token to the edge router, which provides QoS accordingly.

As should be apparent from the above description, the process defined in RFC 3313 requires a significant amount of additional messaging to establish QoS for a SIP connection. In particular, the link between the proxy and the edge router experiences a significant amount of additional traffic. Furthermore, hardware and/or software on each device involved in the message exchange must be modified to ensure that the devices properly handle the RFC 3313 extension.

Accordingly, there is a need for a system and method that allow for a simplified mechanism of providing QoS in a connection initiated using SIP signaling messages. In particular, there is a need for a solution that minimizes the use of additional messages and eliminates the need to implement additional functionality on every device in the system.

The problems described above are illustrative of those that are addressed by the various exemplary embodiments and are not intended to be exhaustive or limiting of the possible problems addressed or solved. Thus, other problems solved by the various exemplary embodiments will be apparent to those of ordinary skill in the art.

SUMMARY OF THE INVENTION

In light of the present need for in-band DPI media reservation modifications to RFC 3313, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a Deep Packet Inspection (DPI) device is integrated into the provider edge router associated with a user agent client or provided externally in communication with the router. The DPI device monitors the exchange of packets between an originating proxy and a user agent client and inspects the packets to identify SIP control messages. By monitoring the messages exchanged between the two devices, the DPI device may determine the type of application, desired QoS, source, destination, and other information related to the connection. Using this information, the router may then access a policy database to determine whether there is a QoS policy for the application and/or user. Based on this determination, the router may initiate network reservation for an anticipated data flow or store the information so the flow of packets can be remarked as the packets arrive. Accordingly, in various exemplary embodiments, the edge router is aware that QoS should be granted and may reserve resources in the network on behalf of the user agent client.

BRIEF DESCRIPTION OF THE DRAWINGS

In order to better describe various exemplary embodiments, reference is made to the accompanying drawings, wherein.

DETAILED DESCRIPTION OF THE PREFERRED EMBODIMENTS OF THE INVENTION

It should be apparent that, although the following description refers to SIP sessions and control messages, any similar protocol may be used. Thus, any protocol for establishing communications between a source and a node may be used, provided that the control, messages contain sufficient Information from which Quality of Service requirements may be extracted. Other suitable protocols will be apparent to those of skill In the art.

Referring now to the drawings, in which like numerals refer to like components or steps, there are disclosed broad aspects of various exemplary embodiments.

Figure 1:
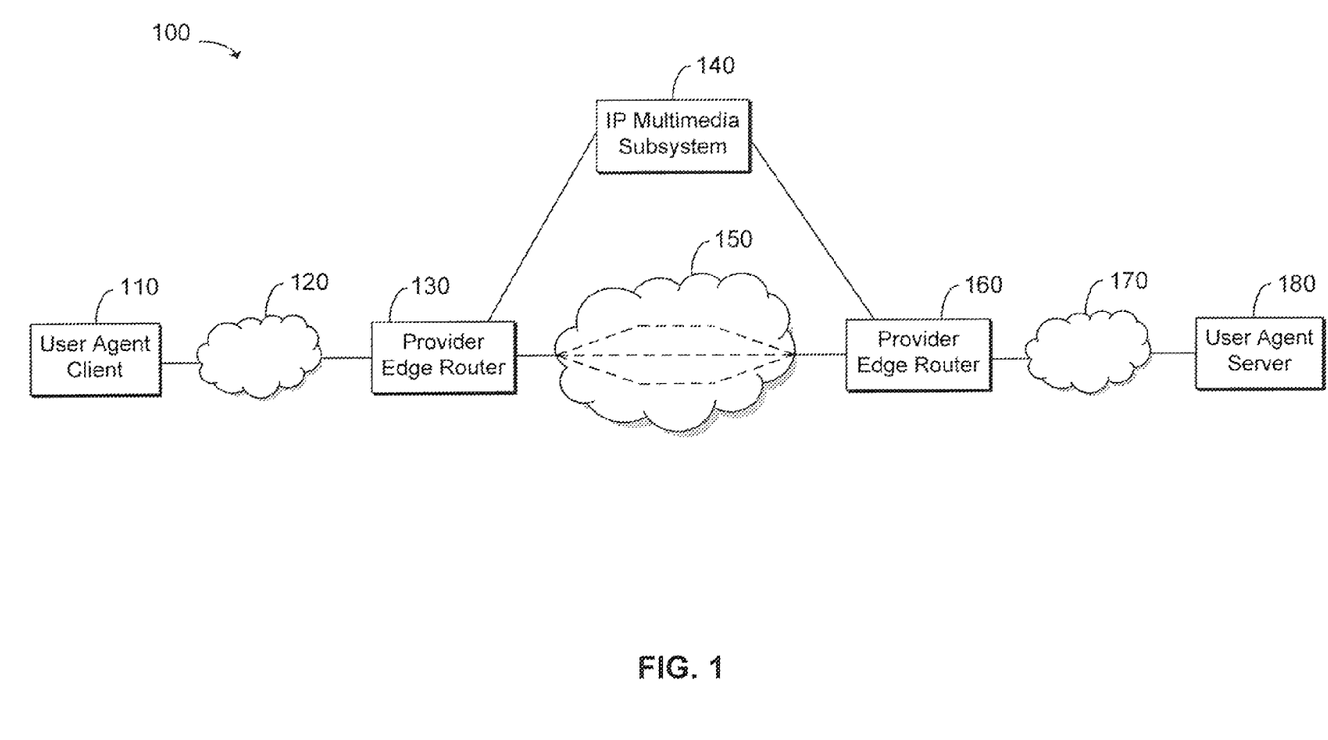
FIG. 1 is a schematic diagram of an exemplary IP network utilizing SIP control messages to establish multimedia sessions.

FIG. 1 is a schematic diagram of an exemplary IP network 100 utilizing SIP control messages to establish multimedia sessions, in various exemplary embodiments, network 100 includes user agent client 110, network 120, provider edge router 130, IP multimedia subsystem 140, core network 150, provider edge router 160, network 170, and user agent server 180.

In various exemplary embodiments, user agent client 110 is a device operated by a user that enables access to network 100 and Issues SIP requests. User agent client 110 may be a personal or laptop computer, cell phone, personal digital assistant, wireless email device, or any other device that supports communications over an IP network. Furthermore, user agent client 110 may send and receive data packets related to one or more sessions with user agent server 180.

Network 120 provides a connection between user agent client 110 and provider edge router 130. Network 120 may be any network capable of sending data and requests between user agent client 110 and provider edge router 130. Accordingly, network 110 may comprise a plurality of routers, switches, bridges, and other components suitable for receiving and forwarding data packets.

Figure 2:
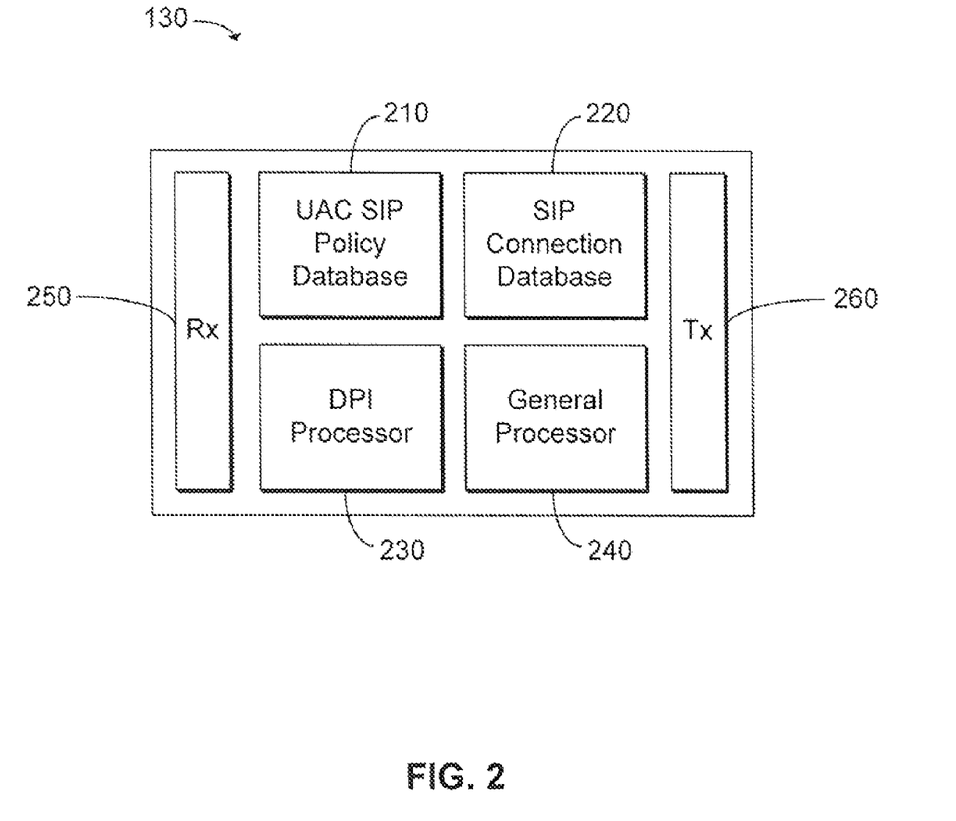
FIG. 2 is a schematic diagram of an exemplary edge router including an integrated DPI device for use in the network of FIG. 1.

In various exemplary embodiments, provider edge routers 130, 160 are a combination of hardware and software adapted to receive incoming packets and forward the data packets into one of the paths in network 150. As described in further detail below with reference to FIG. 2, provider edge routers 130, 160 may comprise a DPI device for analysis of packets exchanged between a user agent client 110 and a proxy in IP multimedia subsystem 140. Based on the information extracted by the DPI device, routers 130, 160 may perform QoS modification on packets associated with a SIP session. Alternatively, DPI device may be deployed outside of routers 130, 160 and use packet marking techniques to relay information about the required QoS to the router. For example, the DPI device may utilize methods like DiffServer remarking to identify applications for which QoS reservation is triggered on routers 130, 160.

IP multimedia subsystem 140 may be a network comprising a number of components configured for establishment of multimedia sessions between user agent client 110 and user agent server 180. In particular, IP multimedia subsystem 140 may include a number of proxies, each in communication with one or more user agent clients 110 and user agent servers 180. As described further below with reference to FIG. 3, these proxies serve as intermediaries in establishing and maintaining a multimedia session between two users. Other components suitable for inclusion in IP multimedia subsystem 140 will be apparent to those of skill in the art.

Figure 5:
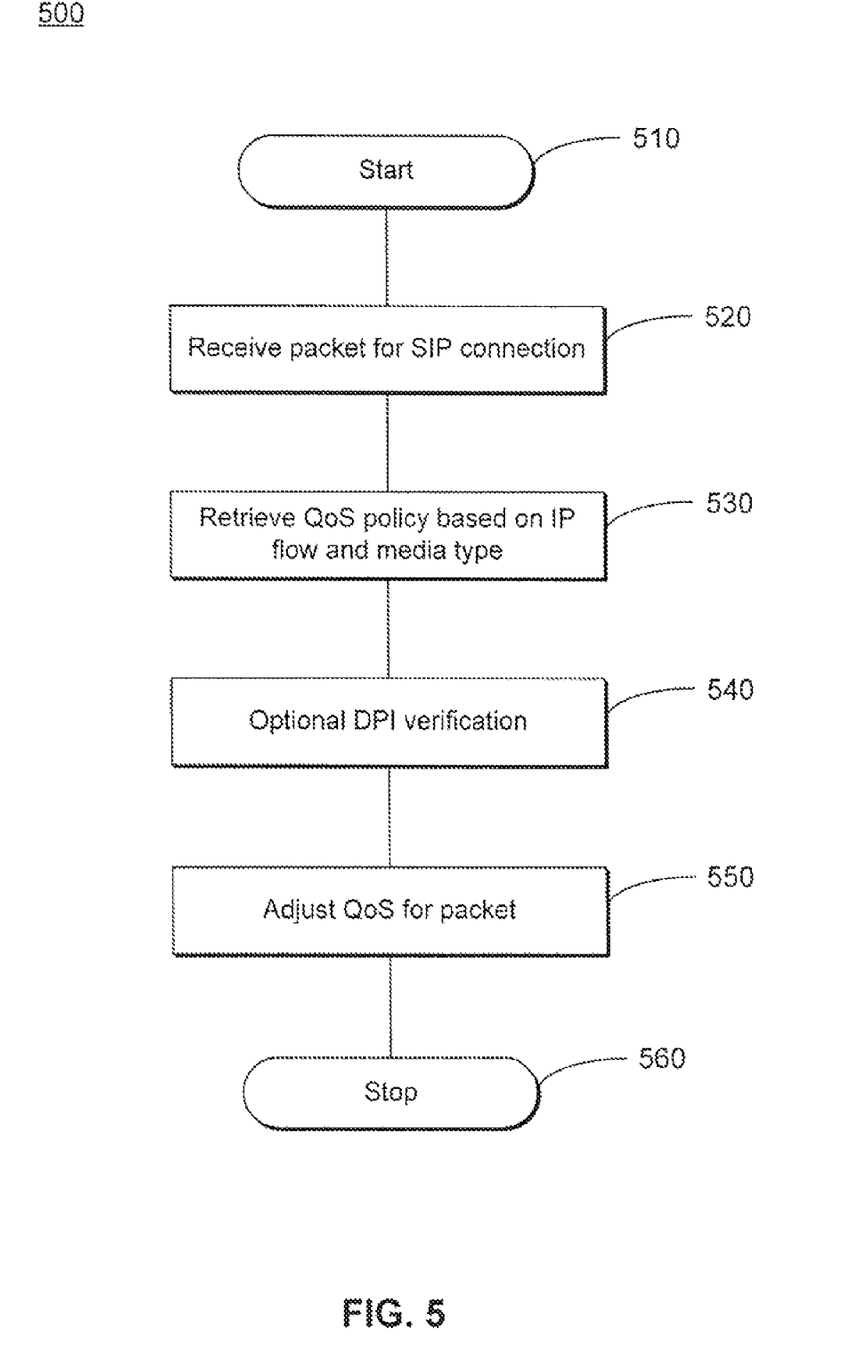
FIG. 5 is a flowchart of an exemplary embodiment of a method for performing QoS reservation for packets associated with a SIP session.

In various exemplary embodiments, core network 150 comprises telecommunications hardware suitable for forwarding data packets received from networks that operate under different protocols. Thus, core network 150 may be, for example, an MPLS network including a plurality of tunnels or label-switched paths. In various exemplary embodiments, each tunnel comprises a plurality of routers and links, with each tunnel having a different set of characteristics, including bandwidth, delay, and packet dropping probability. Accordingly, as described further below with reference to FIG. 5, provider edge router 130, 160 may select an appropriate tunnel for a packet in a SIP session based on the QoS requirements for the session.

Network 170 provides a connection between provider edge router 160 and user agent server 180. Network 170 may be any network capable of sending data and requests between provider edge router 160 and user agent server 180. Accordingly, network 170 may comprise a plurality of routers, switches, bridges, and other components suitable for receiving and forwarding data packets.

In various exemplary embodiments, user agent server 180 is a device operated by a user that enables access to network 100. User agent server 180 receives SIP requests from user agent client 110 and generates a response that accepts, rejects, or redirects the request. As with user agent client 110, user agent server 180 may be a personal or laptop computer, cell phone, personal digital assistant, wireless email device, or any other device that supports communications over an IP network.

It should be apparent that the components of network 100 are exemplary and have been illustrated and described solely for the purpose of explanation. Thus, in various exemplary embodiments, network 100 includes additional components configured to implement additional functionality. Alternatively, two or more components of network 100 may be merged into a single component, such that network 100 includes fewer total components. Other suitable configurations of network 100 will be apparent to those of skill in the art.

FIG. 2 is a schematic diagram of an exemplary edge router 130 including an integrated DPI device for use in network 100 of FIG. 1. In various exemplary embodiments, edge router 130 includes User Agent Client SIP policy database 210, SIP connection database 220, DPI processor 230, general processor 240, receiver 250, and transmitter 260. The following description of the components of edge router 130 is intended to introduce the functionality of each component. A more detailed explanation of the provisioning of QoS will be provided further below with reference to FIGS. 3-5.

In various exemplary embodiments, UAC SIP policy database 210 maintains information regarding QoS provisioning for SIP connections. In particular, UAC SIP policy database 210 indicates, for each user agent client 110, whether the user is allowed to reserve QoS and, if so, for which applications. Thus, for example, UAC SIP policy database 210 could indicate that user agent client 110 may reserve resources for VoIP and videoconferencing, but not for streaming multimedia.

UAC SIP policy database 210 may also indicate whether a user agent client 110 may reserve resources for a connection with a particular user agent server 180. For example, database 210 could indicate that a user may reserve resources when requesting a connection with a first user, but not when connecting with a second user. Database 210 may also store a data transfer quota, such that the router 130 will not allow resource reservation after the user has exceeded the quota. Furthermore, database 210 may indicate times of the day at which QoS modification is allowed and not allowed. Other criteria useful in determining whether QoS should be granted will be apparent to those of skill in the art.

UAC SIP policy database 210 may also store information regarding the applicable policies based on, for example, the application, source, destination, time of day, and any other relevant factors. The policy may, for example, specify a Differentiated Services Code Point (DSCP) priority, Type of Service (TOS) marking, applicable MPLS tunnel, or any other information used to provide QoS for a particular SIP session.

In various exemplary embodiments, SIP connection database 220 stores state information regarding each SIP connection managed by edge router 130. Thus, after interception of a SIP control message by DPI device 230, SIP connection database 220 stores the IP address of the source and destination, port numbers, media types, and any other information extracted from the SIP control message. As described further below with reference to FIG. 5, router 130 may access SIP connection database 220 to extract information required to establish QoS for a packet associated with a SIP connection.

It should be apparent that UAC SIP policy database 210 and SIP connection database 220 may each be implemented as a computer-readable storage medium configured to store the required data. The computer-readable storage medium could be, for example, a hard drive, flash memory drive, Random Access Memory (RAM), or any other physical storage medium. Databases 210, 220 may also include a processor and any software necessary for processing and retrieval of the data stored therein.

In various exemplary embodiments, DPI processor 230 is a microprocessor or executable software configured to examine any combination of information in layers 2 through 7 of the Open Systems Interconnection (OSI) model. Thus, in various exemplary embodiments, DPI processor 230 performs a "deep" analysis of one or more packets in order to identify SIP control messages, which are typically contained in layers 4 through 7. DPI processor 230 may then analyze the SIP control message to extract information from header fields or a Session Description Protocol (SDP) field This information may include an application, compression scheme, media type, source, destination, port number, information about network elements, and any other fields in the SIP control message. The extracted information may then be stored in SIP connection database 220 and used by router 130 in granting QoS for a particular SIP connection.

In various exemplary embodiments, general processor 240 is configured to perform typical packet processing operations. Thus, general processor 240 may, for example, generate RSVP messages and perform packet marking. Other operations performed by general processor 240 will be apparent to those of ordinary skill in the art.

Router 130 may also include receiver 250 and transmitter 260, which may be a combination of hardware and/or software configured to receive and transmit packets, respectively. Thus, receiver 250 may receive SIP control messages from a proxy located in IP multimedia subsystem 140, while transmitter 260 may return SIP control messages.

It should be apparent that, although described above as distinct components, UAC SIP policy database 210, SIP connection database 220, DPI processor 230, general processor 240, receiver 250, and transmitter 260 may be merged into fewer modules. Alternatively, the functions performed by one or more of the components 210, 220, 230, 240, 250, 260 may be separated into multiple components, such that router 130 includes additional components. Alternative arrangements of the functionality of router 130 will be apparent to those of ordinary skill in the art.

As mentioned above, as an alternative to the configuration described with reference to FIG. 2, the DPI device may be deployed outside of router 130 and use packet marking techniques to relay information regarding applications for which QoS is provided. In such embodiments, DPI processor 230 may be located in the external DPI device.

Figure 3:
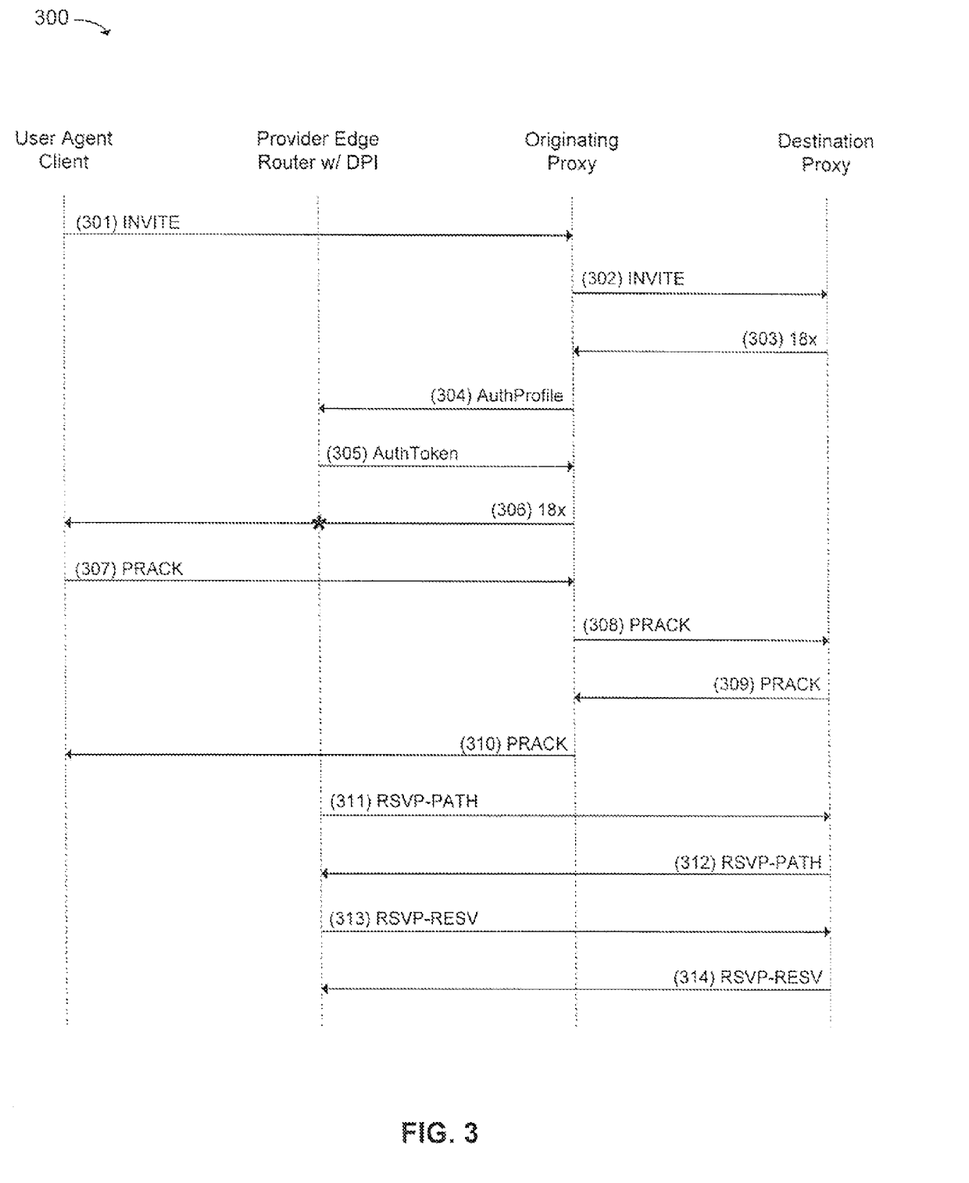
FIG. 3 is an exemplary message diagram illustrating the exchange of messages between entities in the network of FIG. 1.

FIG. 3 is an exemplary message diagram 300 illustrating the exchange of messages between entities in network 100 of FIG. 1. Diagram 300 and the following description are intended to provide an overview of the messages exchanged in a network 100 according to one embodiment. Further details regarding the functionality of edge router 130 will be provided below with reference to FIGS. 4 and 5. Again, it should be apparent that, although diagram 300 is described with reference to a DPI device integrated into an edge router, the DPI device may instead be a device located externally to the edge router.

In step 301, a user agent client, such as user agent client 110 of FIG. 1, seeks to establish a media session with a user agent server, such as user agent server 180 of FIG. 1. Thus, the UAC sends an INVITE request to the user agent client via an originating proxy, which could be located in IP multimedia subsystem 140 of FIG. 1.

In order to reserve resources, the UAC includes a header with a media authorization token indicating that QoS changes are desired. The INVITE request may include a number of other header fields that specify, inter alia, the UAC's address and a Uniform Resource identifier (URI) associated with the UAS. The body of the INVITE request may include a description of the session encoded in another protocol format, such as the Session Description Protocol (SDP). This description may include, for example, the type of media, codec, and sampling rate.

When the originating proxy receives the INVITE request, execution proceeds to step 302, where the originating proxy forwards the request to a destination proxy, which could be located in IP multimedia subsystem 140 of FIG. 1. The destination proxy then communicates with the user agent server (not shown) to determine whether the user agent server will accept the session. In step 303, the destination proxy forwards a response from the user agent server, which could be, for example, a 180 (Ringing) response.

Upon receipt of the 18x response, the originating proxy has sufficient information regarding the end points, bandwidth, and characteristics of the media exchange. Thus, in step 304, the originating proxy sends a policy setup message, AuthProfile, to a provider edge router, such as provider edge router 130 of FIG. 1. The provider edge router processes the policy setup message to determine whether QoS should be granted for the session. In particular, as described further below with reference to FIG. 4, the provider edge router determines whether QoS provisioning is allowed based on the application, source, destination, and any other relevant parameters. Upon verification that QoS is available, execute proceeds to step 305, where the provider edge router sends an authorization token (AuthToken) back to the originating proxy.

In step 306, the originating proxy forwards, to the UAC, the 18x message received from the destination proxy. As indicated by the asterisk at the provider edge router, however, the DPI device intercepts and analyzes this message, in particular, the DPI device extracts and stores information regarding the session from the header fields and/or SDP content in the message. As described further below with reference to FIG. 5, this information may be used to facilitate remarking for packets belonging to the session.

In steps 307 and 308, the UAC forwards an acknowledgement (ACK) or provisional acknowledgement (PRACK) to the UAS through the originating proxy and destination proxy. In steps 309 and 310, the UAS replies by sending its own ACK or PRACK through the destination proxy and originating proxy. The session between the UAC and UAS is now established, such that the UAC and UAS may exchange data using an appropriate transport protocol.

In step 311, the provider edge router sends an RSVP-PATH message to reserve resources for the session along the forward path from the source provider edge router to the provider edge router that manages connections for the user agent server. In step 312, the provider edge receives an RSVP-PATH response from the provider edge router that manages connections for the user agent server.

In step 333, the provider edge router sends an RSVP-RESV message to reserve resources for the session along the reverse path from the provider edge router to the provider edge router that manages connections for the user agent server. In step 314, the provider edge receives an RSVP-RESV response from the provider edge router that, manages connections for the user agent server.

It should be apparent that the provider edge router, not the user agent client, manages the resource reservation request in steps 311-314. This configuration results in a significant decrease in the number of messages exchanged and minimizes the need to modify user agent client hardware and/or software to support QoS for SIP sessions.

Although described as using Resource ReSerVation Protocol (RSVP) messages to establish a given QoS in the network, it should be apparent that any method of providing QoS may be used. Thus, as an alternative to reserving resources for an anticipated data flow, the provider edge router may instead remark packets as they arrive or change the path to be taken by packets belonging to a particular session. Some of these alternatives are described in further detail below with reference to FIGS. 4 and 5.

Figure 4:
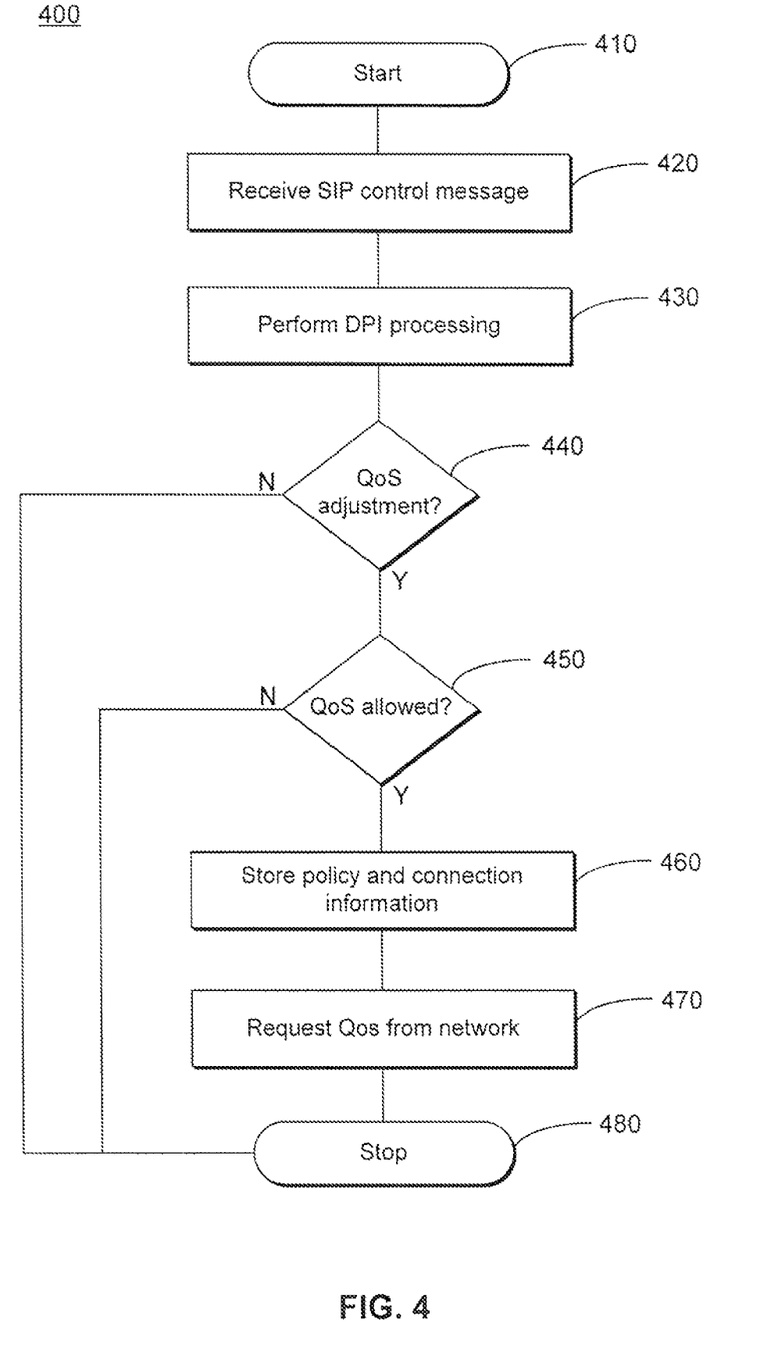
FIG. 4 is a flowchart of an exemplary embodiment of a method for performing deep packet inspection on SIP control messages.

FIG. 4 is a flowchart of an exemplary embodiment of a method 400 for performing deep packet inspection on SIP control messages. The processing steps of method 400 may be performed by an edge router 130 to determine whether QoS should be granted for a particular SIP session based on information extracted from a SIP control message. Alternatively, the processing steps of method 400 may be performed by a DPI device located externally from edge router 130.

Exemplary method 400 starts in step 410 and proceeds to step 420, where DPI device 230 of router 130 intercepts a SIP control message sent from an originating proxy to user agent client 110. Exemplary method 400 then proceeds to step 430, where DPI device 230 analyzes information contained in layers 2 through 7 of the SIP control message to extract information from the message. In particular, DPI device 230 may extract information regarding the desired QoS from the media authorization token included in the message. DPI device 230 may also extract the application, information regarding the source and destination, compression schemes, and any other information used by router 130 to determine whether QoS should be granted.

After extracting information in step 430, exemplary method 400 proceeds to decision step 440, where router 130 determines whether QoS adjustment is required. In particular, router 130 may analyze the information contained in the authorization token to determine whether the user agent client has requested QoS adjustment. When it is determined in decision step 440 that QoS adjustment is not required, exemplary method 400 proceeds to step 480, where exemplary method 400 stops. Alternatively, when it is determined that QoS adjustment is required, exemplary method 400 proceeds to decision step 450.

In decision step 450, router 130 determines whether QoS provisioning is allowed for the SIP session associated with the control message. In making this decision, router 130 may access UAC SIP policy database 210. Thus, router 130 may consider whether the particular source or destination user may be granted QoS, whether QoS is allowed for the particular application, whether the user has met his or her quota, and whether QoS is allowed at the current time. Other factors used to determine whether QoS may be provided will be apparent to those of skill in the art.

When it is determined in decision step 450 that QoS provisioning is not allowed, exemplary method 400 proceeds to step 480, where exemplary method 400 stops. Alternatively, when it is determined that QoS is allowed, exemplary method 400 proceeds to step 460.

In step 460, router 130 stores, in the SIP connection database 220, the information extracted in step 430 that is necessary for subsequent processing of packets associated with the flow. Thus, router 130 may store, for example, the IP address of the source and destination, port numbers, media types, and any other information extracted from the SIP control message. The use of this information by router 130 is described further below with reference to FIG. 5.

Exemplary method 400 then proceeds to step 470, where router 130 may optionally perform resource reservation on the network based on the policy information contained in the UAC SIP policy database 210. Thus, for example, router 130 may determine the bandwidth required for the SIP session and reserve bandwidth along a path using an RSVP message. Other protocols and reservation methods will be apparent to those of skill in the art. In addition to or as an alternative to performing resource reservation, router 130 may remark user data packets associated with the SIP control session, as described further below with reference to FIG. 5.

After requesting QoS from the network in step 470, exemplary method 400 proceeds to step 480, where exemplary method 400 stops.

FIG. 5 is a flowchart of an exemplary embodiment of a method 500 for performing QoS reservation for user data packets associated with a SIP control session. The processing steps of method 500 may be performed by an edge router 130 upon receipt of a packet sent from a user agent client to a user agent server using a transport protocol.

Exemplary method 500 starts in step 510 and proceeds to step 520, where receiver 250 of router 130 receives a user data packet associated with a SIP control connection. Exemplary method then proceeds to step 530, where router 130 accesses information stored in UAC SIP policy database 210 and SIP connection database 220 to determine the appropriate QoS for the connection. This determination could be based, for example, on the underlying application, source and/or destination of the connection, time of day, user service agreement, and any other factors relevant in determining an appropriate quality of service.

Exemplary method 500 then proceeds to step 540, where DPI device 230 of router 130 optionally verifies the application identified by SIP control connection database 220. More specifically, because DPI device 230 now has access to packets associated with the application, DPI device 230 may verify the initial determination made based on the information contained in the SIP control message.

Assuming DPI device 230 successfully verifies the application, exemplary method 500 proceeds to step 550, where router 130 adjusts the quality of service for the packet. Thus, router 130 may remark the packet using, for example, a Differentiated Services Code Point (DSCP) priority or a Type of Service (TOS) marking. Alternatively, router 130 may set the applicable MPLS tunnel for the packet. Other QoS adjustments will be apparent to those of skill in the art.

As an alternative to verifying the application before granting QoS, in various exemplary embodiments, QoS is established as part of the SIP connection process. Then, upon application verification by the DPI device 230, the granted QoS is either preserved or dropped down. Thus, in these embodiments, step 550 would be performed prior to step 540. It should be apparent, that regardless of the order in which these steps are performed, router 130 may store partial information as it is obtained, such that information is stored until enough information is available to grant the final QoS.

After adjusting the QoS for the packet belonging to the SIP session, exemplary method 500 proceeds to step 560, where exemplary method 500 stops.

It should be apparent from the foregoing description that various exemplary embodiments avoid a significant amount of messaging and eliminate unnecessary configuration of the user agent client. In particular, because the provider edge router includes a DPI device that recognizes the SIP control messages, the router may capture the information necessary to reserve resources for the session, thereby eliminating the need for the user agent client to send and manage reservation messages. Furthermore, various exemplary embodiments significantly reduce the number of interactions between the proxy and edge router. Other advantages and benefits provided for by the embodiments described herein will be apparent to those of skill in the art.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative proposes only and do not in any way limit the invention, which is defined only by the claims.

What is claimed is:

1. A system for implementing Quality of Service (QoS) for a Session Initiation Protocol (SIP) connection between a source node and a destination node, the system comprising:
    a receiver that receives data transferred between the source node and the destination node;
    a transmitter that transmits data between the source node and the destination node:
    a non-transitory computer-readable storage medium comprising a SIP policy database that stores QoS policies for nodes and applications serviced by a router, and a SIP connection database that stores information used to identify connections for the serviced nodes;
    a Deep Packet Inspection (DPI) processor configured to intercept a SIP control message transferred between the source node and the destination node over a control channel, extract connection information regarding the SIP connection from from at least one of layers 4 through 7 of the OSI model of the control message, and store the connection information in the SIP connection database; and
    a general processor that modifies the QoS for packets belonging to the SIP connection at one or more network nodes between the transmitter and the destination node using QoS information obtained by querying the SIP policy database using the connection information in the SIP connection database.

2. The system for implementing QoS for a SIP connection between a source node and a destination node according to claim 1, wherein the receiver, the transmitter, the computer-readable storage medium, the DPI processor, and the general processor are integrated into the router.

3. The system for implementing QoS for a SIP connection between a source node and a destination node according to claim 1, wherein the receiver, the transmitter, the computer-readable storage medium, and the general processor are integrated into the router and the DPI processor is an external device in communication with the router.

4. The system for implementing QoS for a SIP connection between a source node and a destination node according to claim 1, wherein:
    the DPI processor is further configured to process user data associated with the control channel to identify an end-user application, and
    the general processor modifies the QoS for packets belonging to the connection using QoS information obtained by querying the SIP policy database using the connection information and the identified end-user application.

5. The system for implementing QoS for a SIP connection between a source node and a destination node according to claim 1, wherein the QoS policies stored in the SIP policy database specify whether QoS may be provided for a particular user associated with the source node.

6. The system for implementing QoS for a SIP connection between a source node and a destination node according to claim 1, wherein the QoS policies stored in the SIP policy database specify whether. QoS may be provided for a particular application associated with the SIP connection.

7. The system for implementing QoS for a SIP connection between a source node and a destination node according to claim 1, wherein the QoS policies stored in the SIP policy database are based on at least one of an application associated with the connection, a source of the connection, a destination of the connection, and a time of day.

8. The system for implementing QoS for a SIP connection between a source node and a destination node according to claim 1, wherein the connection information extracted by the DPI processor comprises at least one of an application associated with the connection, a compression scheme, a media type, a source of the connection, a destination of the connection, and a port number.

9. The system for implementing QoS for a SIP connection between a source node and a destination node according to claim 1, wherein the general processor modifies the QoS for packets belonging to the connection by marking user data packets associated with the connection using at least one of a Differentiated Services Code Point (DSCP) marking and a Type of Service (ToS) marking.

10. The system for implementing QoS for a SIP connection between a source node and a destination node according to claim 1, wherein the general processor modifies the QoS for packets belonging to the connection by generating a Resource Reservation Protocol (RSVP) message for transmission along a path associated with the connection.

11. The system for implementing QoS for a SIP connection between a source node and a destination node according to claim 1, wherein the general processor modifies the QoS for packets belonging to the connection by redirecting packets trough pre-established network connections associated with different QoS guarantees based on the QoS granted for the connection.

12. The system for implementing QoS for a SIP connection between a source node and a destination node according to claim 1, wherein the source node is a user agent client in a Session Initiation Protocol (SIP) connection.

13. The system for implementing QoS for a SIP connection between a source node and a destination node according to claim 1, wherein the destination node is a user agent server in a Session Initiation Protocol (SIP) connection.

14. A method of providing QoS for Session Initiation Protocol (SIP) connections between a source node and a destination node, the method comprising:
- forwarding a request message from the source node to the destination node over a control channel, the request message indicating that the source node seeks to establish a SIP connection with the destination node;
- forwarding a response from the destination node to the source node, the response indicating acceptance of the SIP connection by the destination node;
- intercepting the response by a Deep Packet Inspection (DPI) processor;
- extracting, by the DPI processor, connection information regarding the SIP connection from at least one of layers 4 through 7 of the OSI model of the response; and
- modifying the QoS for packets belonging to the SIP connection at one or more network nodes between the DPI processor and the destination node, the QoS based at least in part on the connection information extracted by the DPI processor.

15. The method of providing QoS for SIP connections between a source node and a destination node according to claim 14, further comprising:
- processing, by the DPI processor, user data associated with the control channel to identify an end-user application, and
- modifying the QoS for packets belonging to the connection based at least in part on the connection information extracted by the DPI processor and the end-user application identified by the DPI processor.

16. The method of providing QoS for SIP connections between a source node and a destination node according to claim 14, wherein the request message is a Session Initiation Protocol (SIP) invite request comprising a media authorization token and a Session Description Protocol (SDP) field.

17. The method of providing QoS for SIP connections between a source node and a destination node according to claim 14, wherein the response is a SIP ringing response.

18. The method of providing QoS for SIP connections between a source node and a destination node according to claim 14, further comprising a step of determining whether. QoS provisioning is allowed for the connection by querying a SIP policy database using the connection information.

19. The method of providing QoS for SIP connections between a source node and a destination node according to claim 14, further comprising a step of determining how to modify the QoS by querying a SIP policy database using the connection information.

20. The method of providing QoS for SIP connections between a source node and a destination node according to claim 14, wherein the connection information is extracted by the DPI processor from at least one of a header field and an SDP field in the response.

21. The method of providing QoS for SIP connections between a source node and a destination node according to claim 14, further, comprising a step of storing the connection information extracted by the DPI processor in a SIP connections database.

22. The method of providing QoS for SIP connections between a source node and a destination node according to claim 14, wherein the step of modifying the QoS comprises:
- querying a SIP policy database using the connection information;
- generating at least one Resource Reservation Protocol (RSVP) message based on QoS information obtained from the SIP policy database; and
- sending RSVP messages to reserve bandwidth along a path associated with the connection.

23. The method of providing QoS for SIP connections between a source node and a destination node according to claim 14, wherein the step of modifying the QoS comprises:
- querying a SIP policy database using the connection information; and
- remarking packets belonging to the connection based on QoS information obtained from the policy database.

24. The method of providing QoS for SIP connections between a source node and a destination node according to claim 23, wherein the step of remarking packets tickets utilizes a Differentiated Service Code Point (DSCP) marking.

25. The method of providing QoS for SIP connections between a source node and a destination node according to claim 23, wherein the step of remarking packets utilizes a Type of Service (ToS) marking.

* * * * *

UNITED STATES PATENT AND TRADEMARK OFFICE
CERTIFICATE OF CORRECTION

PATENT NO. : 8,159,941 B2
APPLICATION NO. : 12/200598
DATED : April 17, 2012
INVENTOR(S) : Andrew Dolganow and Steven Edward Morin It is certified that error appears in the above-identified patent and that said Letters Patent is hereby corrected as shown below:

Column 10, line 23, claim 6, please change "whether. QoS" to "whether QoS"

Column 10, line 55, claim 11, please change "trough" to "through"

Column 11, lines 41 and 42, claim 18, please change "whether. QoS" to "whether QoS"

Column 12, line 13, claim 21, please change "further, comprising" to "further comprising"

Column 12, line 35, claim 24, please delete the word "tickets"

Signed and Sealed this
Fifth Day of June, 2012

David J. Kappos
*Director of the United States Patent and Trademark Office*